United States Patent [19]

Reintanz

[11] Patent Number: 5,743,469
[45] Date of Patent: Apr. 28, 1998

[54] DEVICE FOR CLEANING FLUE GASES IN FLUE GAS DESULPHURIZATION INSTALLATIONS BY SPRAYING A LIME SUSPENSION INTO THE FLUE GAS

[76] Inventor: Bernhard Reintanz, Karlsbader Str. 10, D-34225 Baunatal, Germany

[21] Appl. No.: 464,643
[22] PCT Filed: Sep. 24, 1993
[86] PCT No.: PCT/DE93/00914
§ 371 Date: Jun. 6, 1995
§ 102(e) Date: Jun. 6, 1995
[87] PCT Pub. No.: WO94/15700
PCT Pub. Date: Jul. 21, 1994

[30] Foreign Application Priority Data

Jan. 14, 1993 [DE] Germany ............... 43 00 751.1

[51] Int. Cl.⁶ .................................................. B05B 1/26
[52] U.S. Cl. ........................... 239/518; 239/523; 134/82
[58] Field of Search .................... 239/499, 505, 239/514, 518, 523; 134/182

[56] References Cited

U.S. PATENT DOCUMENTS

| 2,704,174 | 3/1955 | Uxa ......................... 239/518 |
| 3,245,474 | 4/1966 | Romero ..................... 239/499 |
| 5,516,047 | 5/1996 | Kubach et al. ............. 239/585.5 |

FOREIGN PATENT DOCUMENTS

| 0 118 017 | 9/1984 | European Pat. Off. |
| 0 112 101 | 11/1986 | European Pat. Off. |
| 2 152 815 | 4/1973 | France . |
| 2 418 018 | 9/1979 | France . |
| 2 153 593 | 5/1973 | Germany . |
| 2073616 | 10/1981 | United Kingdom . |
| 2 149 685 | 6/1985 | United Kingdom . |

Primary Examiner—Andres Kashnikow
Assistant Examiner—Lisa Ann Douglas
Attorney, Agent, or Firm—Collard & Roe, P.C.

[57] ABSTRACT

The invention concerns a device for cleaning the flue gases in flue-gas desulphurization installations by spraying a lime suspension into the gases, the device having a conical wall (2) disposed in the direction of flow of the liquid which is sprayed into the flue gases.

12 Claims, 7 Drawing Sheets

DEVICE FOR CLEANING FLUE GASES IN FLUE GAS DESULPHURIZATION INSTALLATIONS BY SPRAYING A LIME SUSPENSION INTO THE FLUE GAS

For the purpose of cleaning the flue gases of refuse incineration plants or power plants from harmful substances such as, for example sulphur dioxide, it is known to spray a lime milk suspension into the flue gases.

It is known for said purpose to use for the spraying of the lime milk a spirally wound guide duct with a rectangular cross section, which duct becomes narrower toward the outlet in order to admit the lime milk suspension into the flue gases by way of said guide duct.

Apart from the fact that the spraying effect is unsatisfactory with said device, and that the latter is susceptible to trouble because not all flue gases are contacted by the spray mist, so that parts of the flue gases are discharged into the atmosphere without having been contacted by the lime milk suspension, there exists the risk that said device for the lime milk suspension becomes clogged after only a short time.

Furthermore, a demixing of the lime milk suspension occurs within said known device because of the differences in density between the lime and the water, with the consequence of a poorer cleaning result.

Also, a gas purifier is known (European patent application 118 017) in which the flue gases pass via a feed conduit into a treatment space, where the gases are subjected to the introduction of a cleaning liquid contained in a bath. For said purpose, the liquid is atomized by means of a rotating arrangement of disks, whereby the cleaning liquid is continuously admitted to the disks preferably via a hollow shaft, and said cleaning liquid is then torn from the rotating disks by centrigugal forces, with formation of annular spray zones.

Finest atomization of the lime milk, by which the flue gases are acted upon as intensively as possible, cannot be accomplished with such a gas purifier. Furthermore, demixing effects occur in this case as well.

A venturi washer for removing sulphur dioxide from a stream of gas is known from DE-A 21 53 593. Such a device required much construction expenditure and, furthermore, cannot be directly installed in a flue gas washer; the flue gas washer rather has to be rebuilt to conform to the shape of the Venturi washer, which is the reason for which this technology has not been successful.

A rotation atomizer is known from GB-A 21 49 685, with which the flue gas in a flue gas desulphurization plant is cleaned by spraying a lime milk suspension as well. This rotation atomizer, too, is characterized by a costly and wear-afflicted construction, which is particularly susceptible to clogging if the lime milk suspension contains solids clogging the atomizer.

Therefore, the invention is based on the problem of creating a spraying device which is characterized by a simple and reasonably priced structure; which operates with little maintenance and without clogging; and by which, furthermore, it is assured that the lime milk suspension is sprayed in such a way that all flue gases come into contact with said suspension, which means no parts of flue gas not contacted by the lime milk suspension can be discharged into the outside.

According to the invention, the spraying device for cleaning the flue gases by spraying a lime milk suspension is characterized by a feed tube for the lime milk suspension, whereby a conical jacket with a plane conical surface is associated with the feed tube in the direction of flow of the suspension to be distributed, whereby the conical jacket is arranged on the feed tube by means of a holding device, whereby the conical tip is aligned in the direction on the feed tube, whereby the conical tip of the conical jacket has a spacing from the outlet opening of the feed tube, whereby the spacing of the conical tip from the outlet opening is dimensioned the smaller the diameter the smaller the outlet opening which is selected. In this connection, preferably the edge zone of the conical jacket is angled toward the center axis of the cone, i.e., a transition from the cone to a conical frustum takes place here in order to produce a uniformised flow by such tearing edge.

In this connection, the conical jacket is held on the feed tube for the liquid by a bridge plate mounted in the center, whereby the bridge plate has in the center in the direction of flow a recess. The outlet opening of the feed tube is here provided with a tearing edge in the form of a conical frustum as well, in order to obtain a uniformised oulet flow.

With the help of said device, the lime milk suspension exiting from the feed tube is thus applied to the conical jacket arranged with a spacing from the feed tube, and distributed on the conical jacket in a way such that a liquid jacket is produced without formation of gutters.

Said liquid jacket covers the flue gases within the entire cross sectional range of the flow of flue gases, so that the lime milk suspension consequently comes into contact with all flue gases.

The center recess in the mounting for the conical jacket, such mounting being designed as a bridge plate, assures that the lime milk suspension exiting from the outlet opening of the feed tube can impact the conical jacket without obstruction, so that a uniform distribution of the liquid on the conical jacket is assured in this way, as well as safe discharging of the solid particles carried along by the lime milk suspension.

According to another embodiment, the conical jacket can be supported also by means of one, two or three holding devices mounted eccentrically relative to the outlet opening of the feed tube, such holding devices being arranged on the feed tube distributed across the circumference. With this embodiment too, it is assured that the lime milk suspension exiting from the feed tube can impact the conical jacket without obstruction.

Another embodiment is characterized in that the conical jacket is supported on the feed tube by means of one single holding device mounted eccentrically relative to the feed tube.

Furthermore, the conical tip of the conical jacket may be arranged laterally displaced against the center line of the outlet opening of the feed tube.

With such an embodiment, it is assured that the solids contained in the lime milk suspension are discharged unilaterally (directed toward one side). With such an arrangement within the zone of the flue gas walls, it is thus possible to ensure that the coating applied to the inner side of the flue gas walls is subjected to only little wear by the solid particles.

With the embodiments in which the mounting is designed in the form of bridges arranged eccentrically relative to the outlet opening of the feed tube, the bridge within the zone of the inlet point into the conical jacket is fitted with a streamlined, saddle-like sword on the conical jacket. In this connection, the point of attachment of the sword on the conical jacket is advantageously selected in such a way that it is disposed aligned beneath the inner wall of the feed tube. In this way, it is achieved that the jet of lime milk suspension impacting in said zone is optimally conducted by division.

In addition, the wear is reduced by said measure as well, and only minor eddying occurs on the conical jacket in the site of impact between the lime milk suspension and the saddle attachment.

It is, therefore, achieved by said embodiment that the liquid impacting the conical jacket is not obstructed by the mounting with respect to its gutter-free distribution on the conical jacket.

The conical angle may amount to between 60° and 150°, preferably, however, to between 80° and 130°.

Several embodiments of the device are shown by way of example in the drawing, in which:

FIG. 1 schematically shows the arrangement of the device within the flue gas duct;

Figure 1:
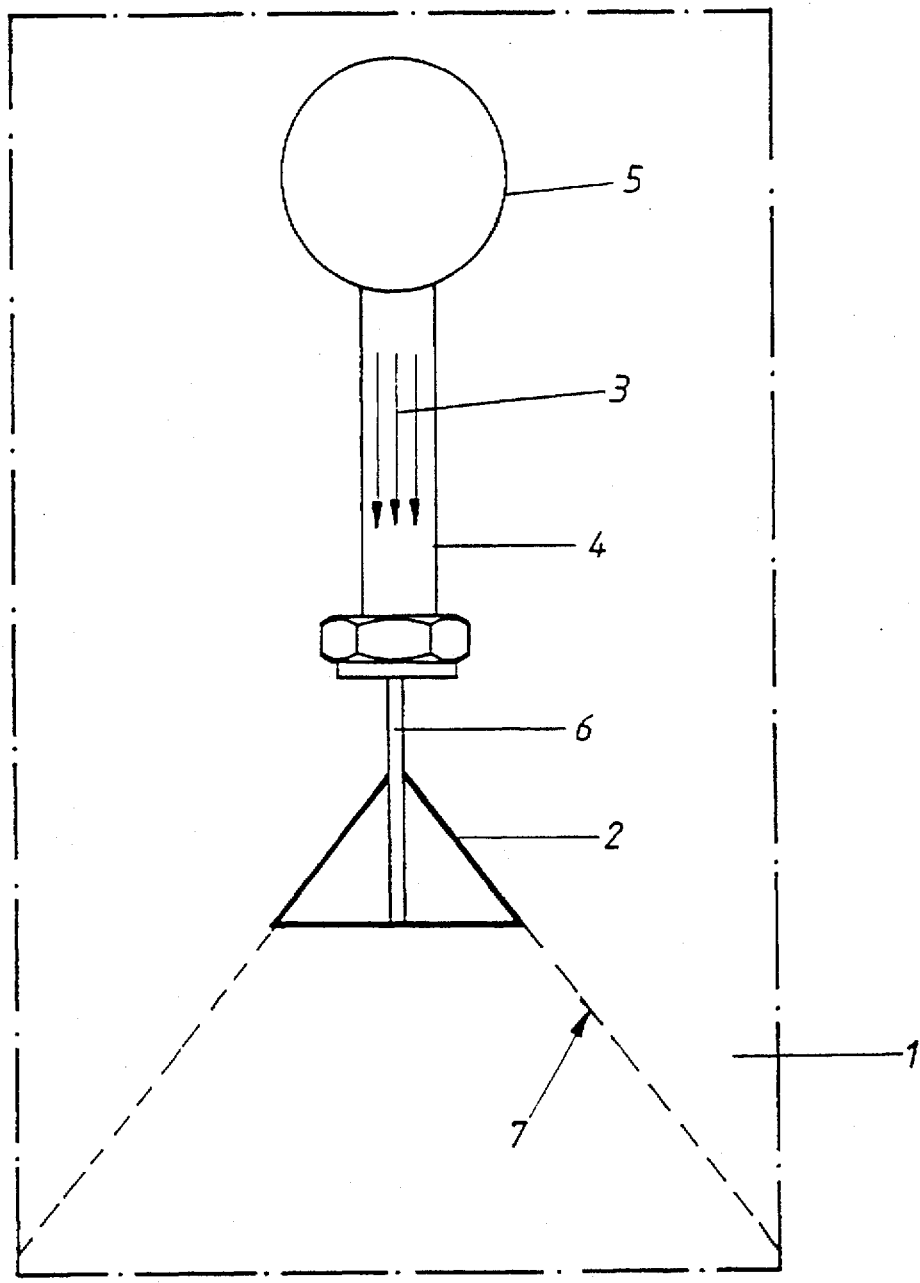

FIG. 1 schematically shows that a conical jacket 2 having a plane conical surface is arranged in the flue gas duct 1, said conical jacket being disposed in the center relative to the direction of flow 3 of the lime milk suspension. The feed tube for the lime milk suspension is denoted by 4, such tube being connected with a manifold 5 arranged crosswise relative to the feed tube. The mounting device for the conical jacket 2 is schematically shown denoted by 6.

It is obvious that when the lime milk suspension is admitted via the tube 4, it impacts the conical jacket 2 and uniformly distributes itself across the surface of the plane conical jacket, so that a liquid jacket 7 is formed, which covers the cross sectional area through which the flue gases pass. The flue gases flowing in the flue gas duct 1 are almost completely acted upon by said liquid jacket and thus brought into contact with the lime milk suspension, whereby the known chemical reaction occurs there (formation of gypsum).

Figure 2:
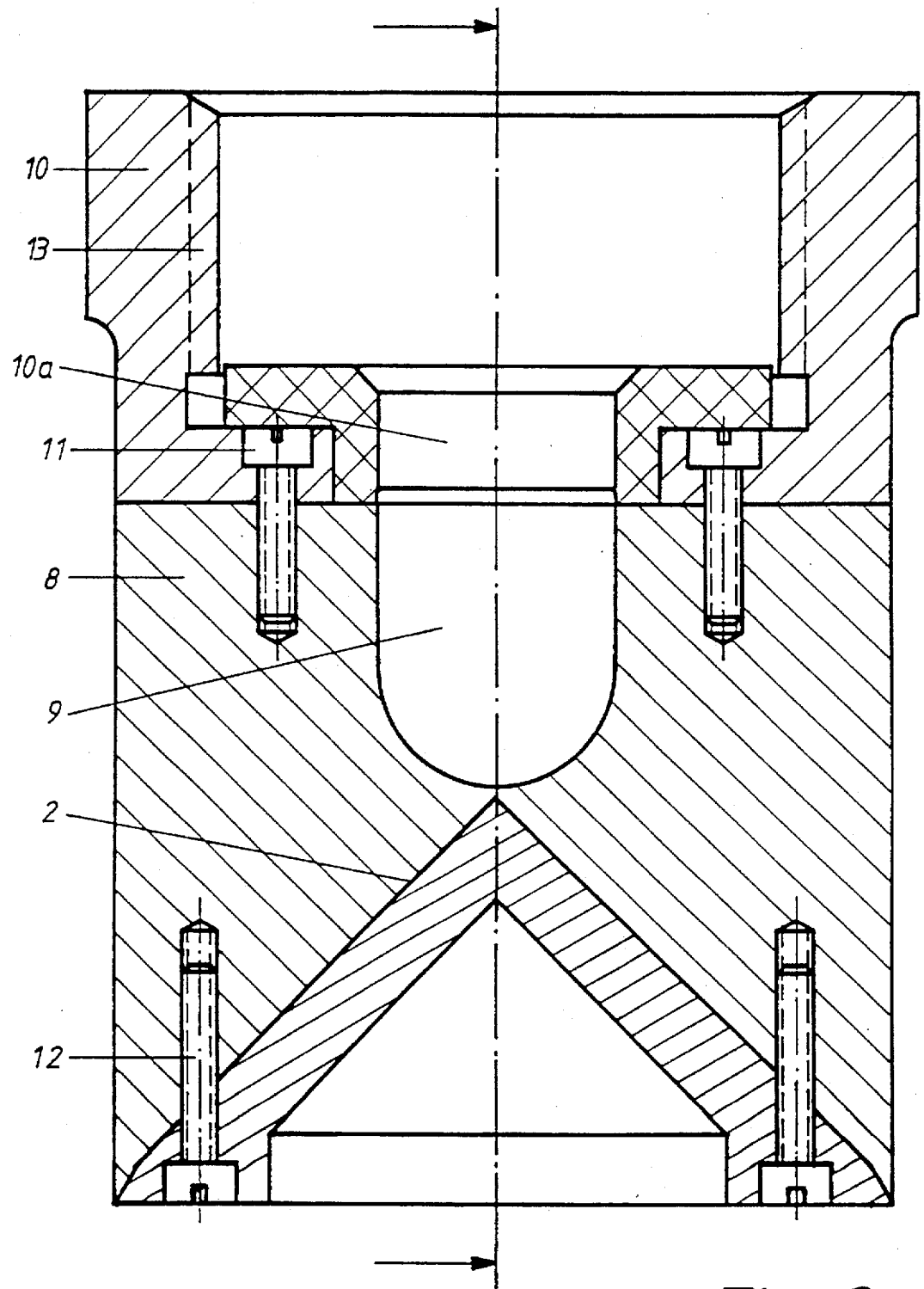
FIG. 2 shows the one embodiment of the conical jacket, in particular the mounting on the feed tube.
Figure 3:
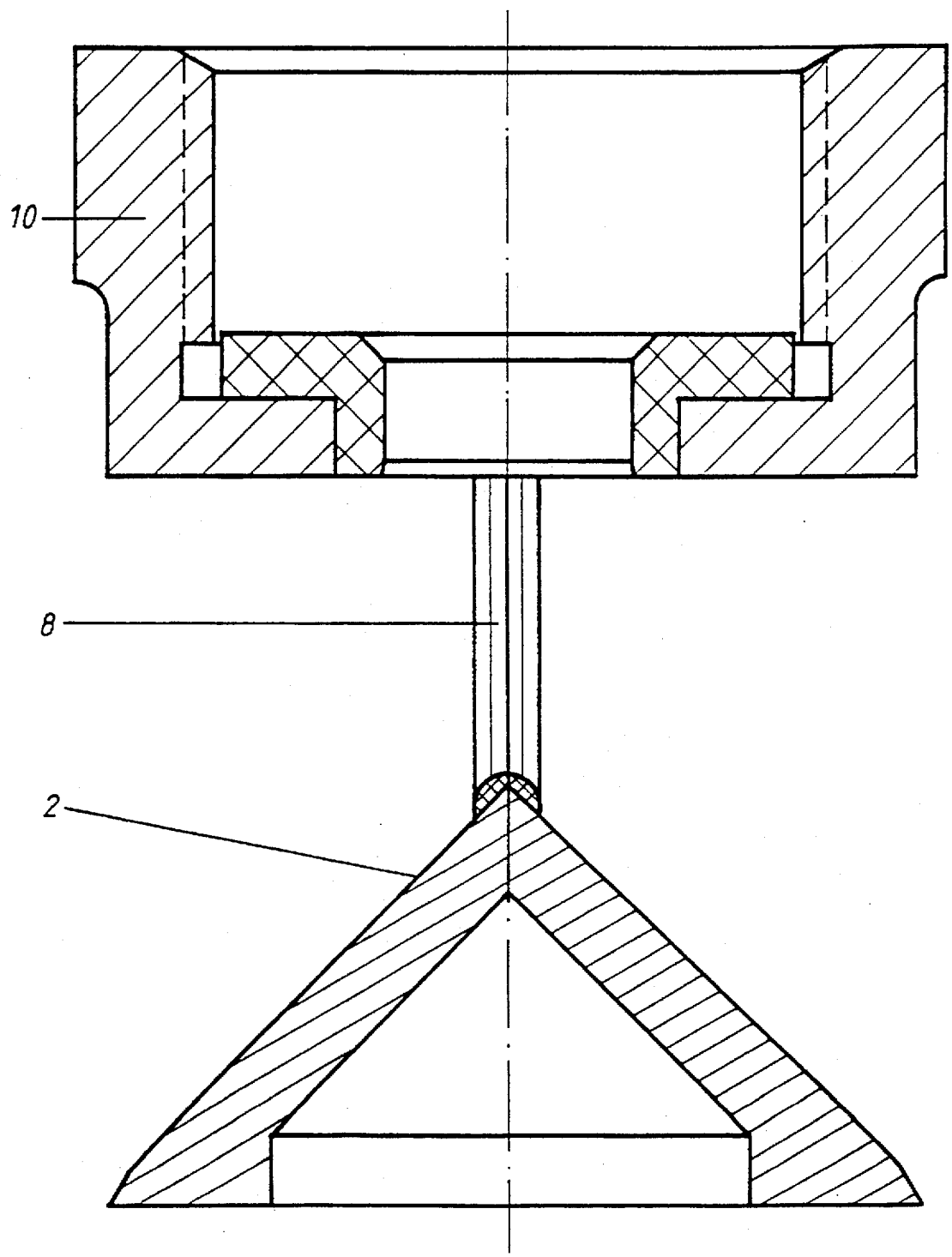
FIG. 3 shows a lateral sectional view of the object according to FIG. 2.

FIG. 2 shows the mounting for the conical jacket 2 in detail; it can be seen that the conical jacket is supported with the help of a bridge plate 8, which is arranged in the center relative to the outlet opening 10a of the feed tube 10 and has a recess 9 in the center.

The bridge plate 8 is fastened on the feed tube 10 with the help of the screws 11. The bridge plate 8 is fastened on the conical jacket with the help of the screws 12. The thread fastening of the feed tube 10 is denoted by 13. From this follows that the flowing liquid flows within the walls of the thread fastening 13 to the conical jacket 2, and that the conical surface of the conical jacket 2 has a certain spacing from the outlet opening 10a of the feed tube 10. If the diameter of the outlet opening 10a is smaller, the spacing of the conical tip from the outlet opening is smaller as well, and vice-versa. For changing the diameter of the outlet opening 10a, an exchangeable nozzle can be fitted with said outlet opening and the corresponding tearing edge (cf FIG. 4).

Figure 4:
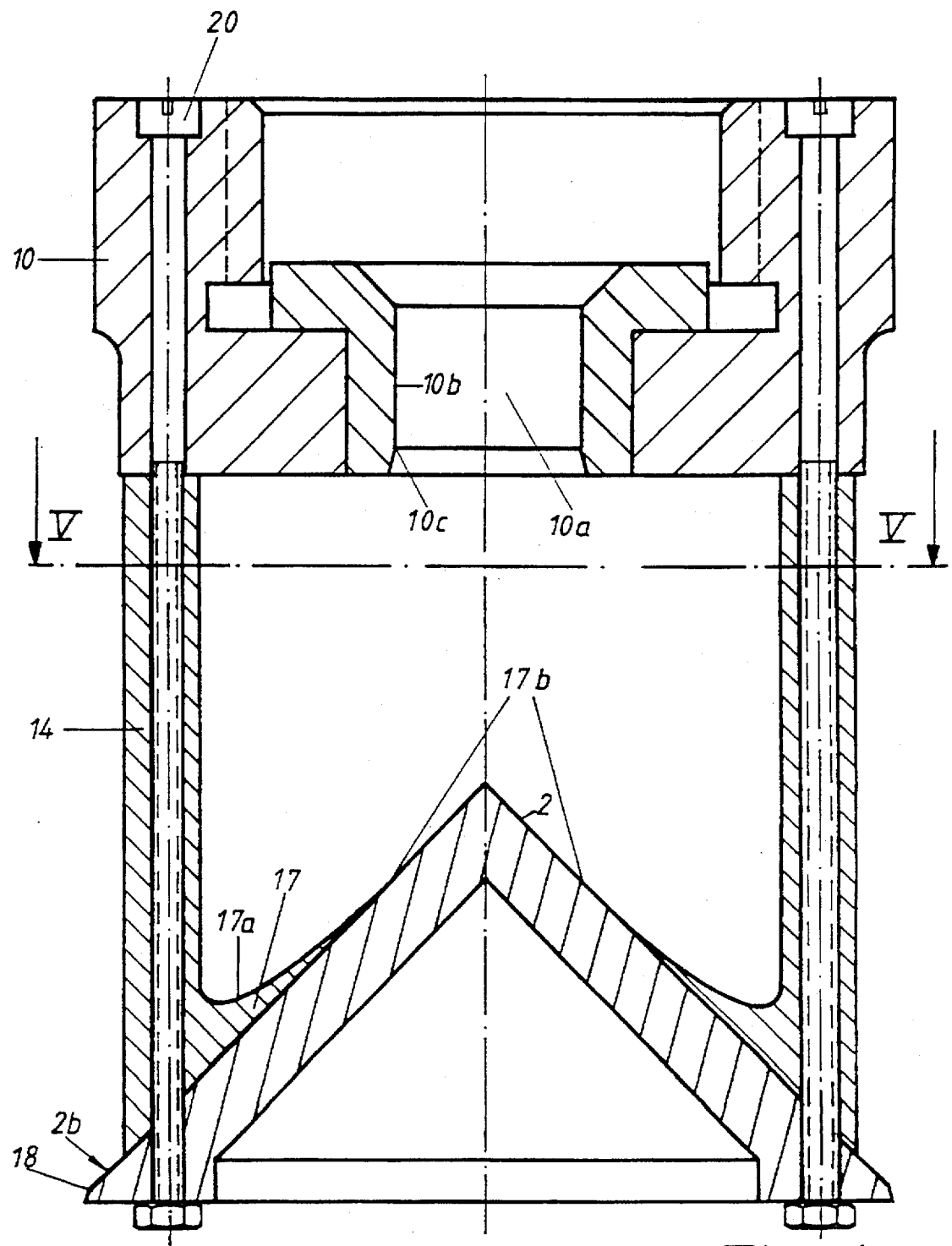
FIG. 4 shows another embodiment, in particular another mounting on the feed tube.

FIG. 4 shows a different support for the conical jacket 2. Said support is arranged eccentrically relative to the outlet opening 10a and consists of the bridges 14, which are mounted on the feed tube 10 distributed across the circumference. The conical jacket is fastened on the bottom end of the bridge with the help of a streamlined, saddle-like sword 17. A fastening screw 20 projects into the bridge, by which the conical jacket is held on the feed tube.

Figure 5:
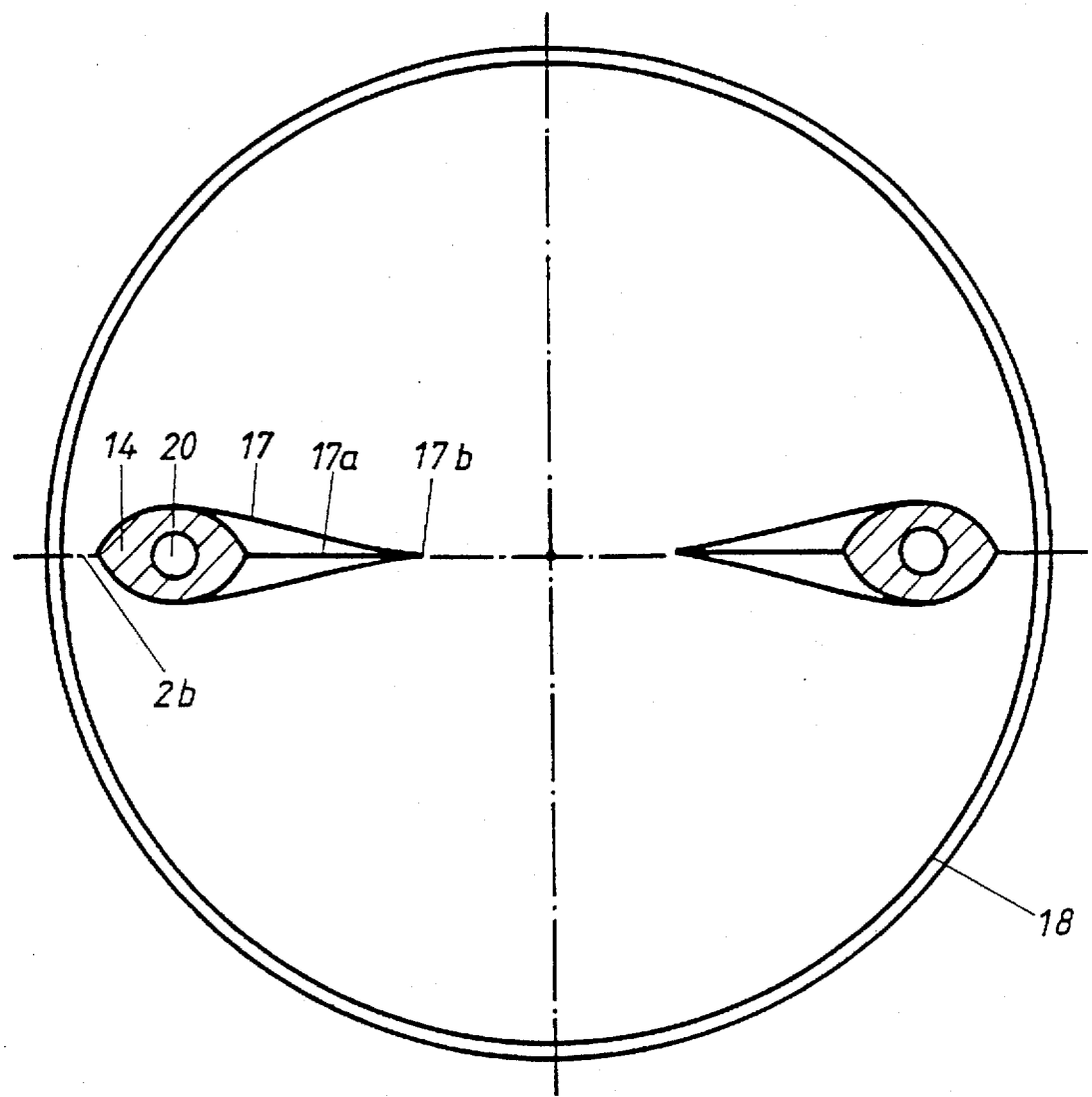
FIG. 5 shows a section according to line V—V in FIG. 4.

The streamlined, saddle-like sword 17 is particularly illustrated in FIG. 5, which shows that the sword is designed blade-like (at 17a) on the side facing the flow. The attachment point 17b of the blade 17a of the sword 17 on the conical jacket 2 is selected in such a way that the attachment point 17b is disposed approximately aligned beneath the inner wall 10b of the feed tube 10a (FIG. 4). In this connection, following the streamlined mounting of the cone in the off-flow direction, sufficient conical surface is still available (at 2b) in order to assure the formation of the gutter-free liquid jacket.

This embodiment, too, assures that the liquid impacting the conical jacket distributes itself on the latter, and that thus a liquid jacket is created with as little formation of gutters as possible, covering the entire cross sectional area of the flue gas duct.

Figure 6:
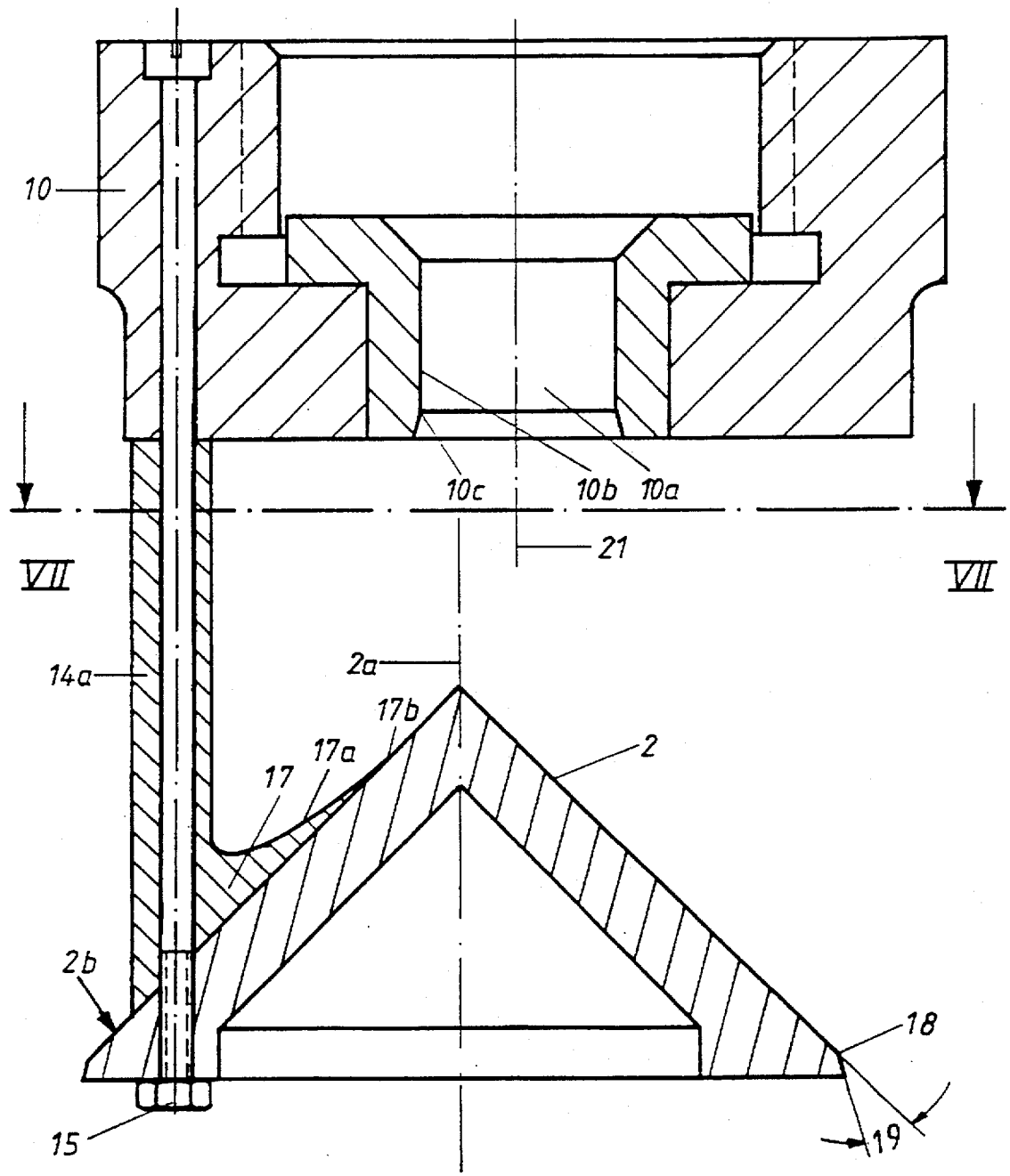
FIG. 6 shows another embodiment, in which the conical tip is disposed eccentrically relative to the center line of the outlet opening of the feed tube.

FIG. 6 shows yet another embodiment, in which the conical jacket 2 is supported with the help of one single bridge 14a arranged eccentrically relative to the center line of the outlet opening of the feed tube 10. The special feature here is that the conical tip 2a of the cone is disposed laterally displaced against the center line 21 of the outlet opening 10a of the feed tube 10.

It is possible in this way to discharge the solids contained in the lime milk suspension unilaterally. With a suitable arrangement of such an embodiment in the flue gas duct, it is possible to accomplish that the inside coating of the flue gas duct is subjected to less wear because only a minor portion of the solid particles will then come into contact with the wall.

With such an embodiment too, the conical jacket is mounted with the help of a streamlined, saddle-like sword 17, which has a blade 17a on the side facing the flow. The bridge 14 is held by the screws 15.

The representation also shows that with all embodiments of the same type, sufficient conical surface is available (at 2b) following the streamlined mounting of the cone in the direction of off-flow in order to assure the formation of the gutter-free liquid jacket. So that the smoothest possible flow is obtained when the liquid flows off the conical jacket, provision can be made in all embodiments within the edge zone 2a of the conical jacket for a liquid tear-off edge in the form of an angle 18, which is denoted by 19.

Figure 7:
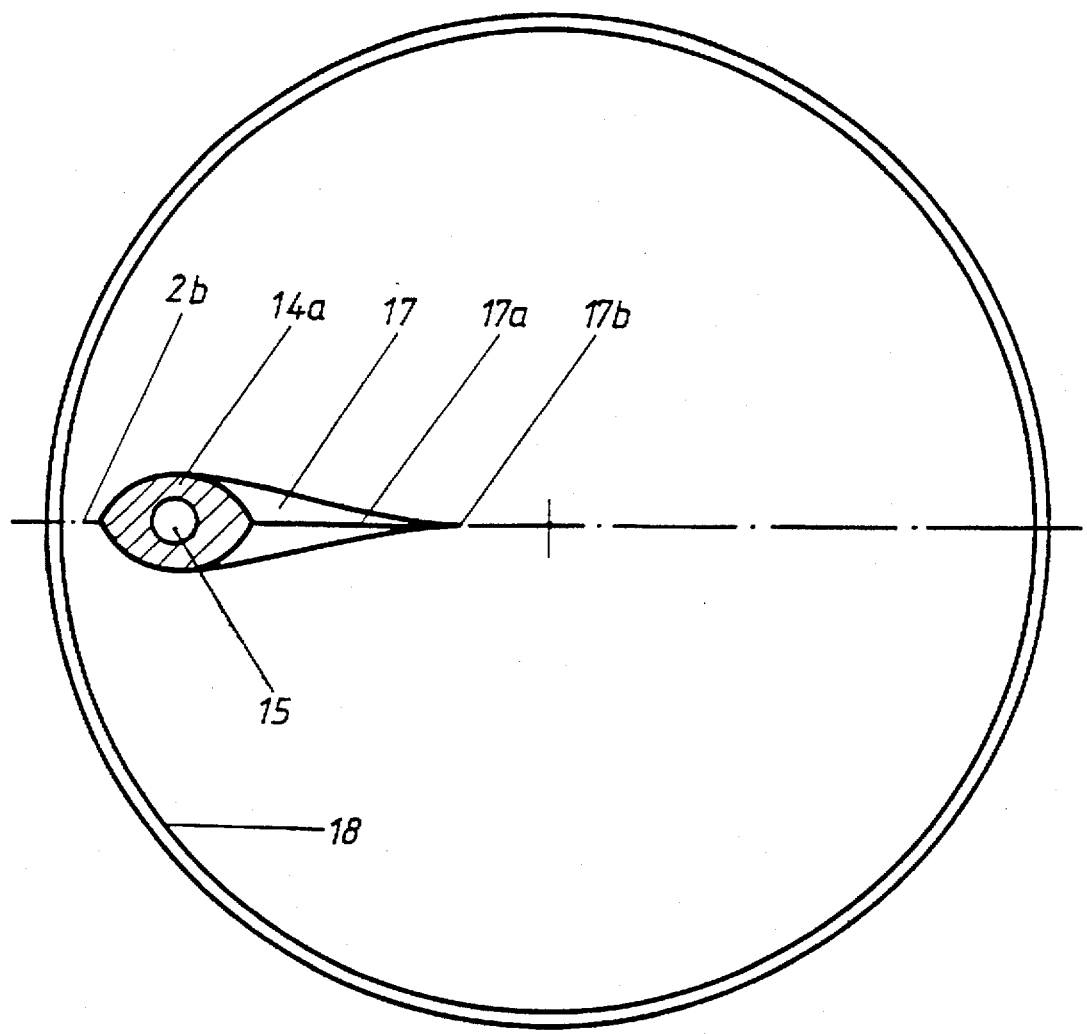
FIG. 7 shows a section according to line VII—VII in FIG. 6.

FIG. 7 shows a top view of the object according to FIG. 6 within the zone of section VII—VII, which illustrates that the by far largest area of the conical jacket is a free surface.

I claim:

1. Spraying device for cleaning flue gases of flue-gas desulphurization installations by spraying a lime milk suspension into the flue gas, comprising a feed tube for the lime milk suspension, having an outlet opening, a conical jacket having a conical tip with a plane conical surface associated with the feed tube in the direction of flow of the suspension to be distributed, the conical tip is aligned in the direction of the feed tube, the conical tip of the conical jacket has a spacing from the outlet opening of the feed tube, and the spacing of the conical tip from the outlet opening is dimensioned such that the smaller the diameter of the outlet opening, the smaller the spacing from the outlet opening which is selected; and wherein the outlet opening of the feed tube has a tearing edge in the form of a conical frustum.

2. Device according to claim 1,
   wherein an edge zone of the conical jacket is angled toward a center axis of the cone.
3. Device according to claim 1,
   wherein the conical jacket is supported on the feed tube for the liquid by means of a bridge plate mounted in the center,
   said bridge plate having in the center a recess in the direction of flow.
4. Device according to claim 1, characterized in that the conical jacket (2) is supported by holding devices (14) mounted eccentrically relative to the outlet opening (10a) of the feed tube (10), said devices being arranged on the feed tube (10) distributed across the circumference.
5. Device according to claim 4, characterized in that the mounting device is a bridge (14, 14a), the latter being fitted within the zone of the inlet point into the conical jacket with a streamlined, saddle-like sword (17).
6. Device according to claim 5, characterized in that the streamlined, saddle-like sword (17) is designed in the form of a blade (17a) on the side facing the flow.
7. Device according to claim 1, characterized in that the conical jacket (2) is held on the feed tube (10) by means of one single mounting device mounted eccentrically relative to the feed tube (10).
8. Device according to claim 7, characterized in that the attachment point (17b) of the fastening on the conical jacket (2) is selected in a way such that it is disposed approximately aligned beneath the inside wall (10b) of the feed tube (10).
9. Device according to claim 1, characterized in that the conical tip of the conical jacket is arranged laterally displaced against the center line (21) of the outlet opening (10a) of the feed tube.
10. Device according to claim 1,
    wherein a conical angle is between 60° and 150°.
11. Device according to claim 1, characterized in that following the fastening of the cone by bridges (14, 14a), sufficient conical surface area is still available (at 2b) in the off-flow direction for forming a gutter-free liquid jacket.
12. Device according to claim 1,
    wherein a conical angle is between 80° and 130°.

* * * * *